Jan. 16, 1940.                L. S. BROWN                2,187,262
                          FURROW DAMMING MACHINE
                    Filed Feb. 21, 1939        2 Sheets-Sheet 1
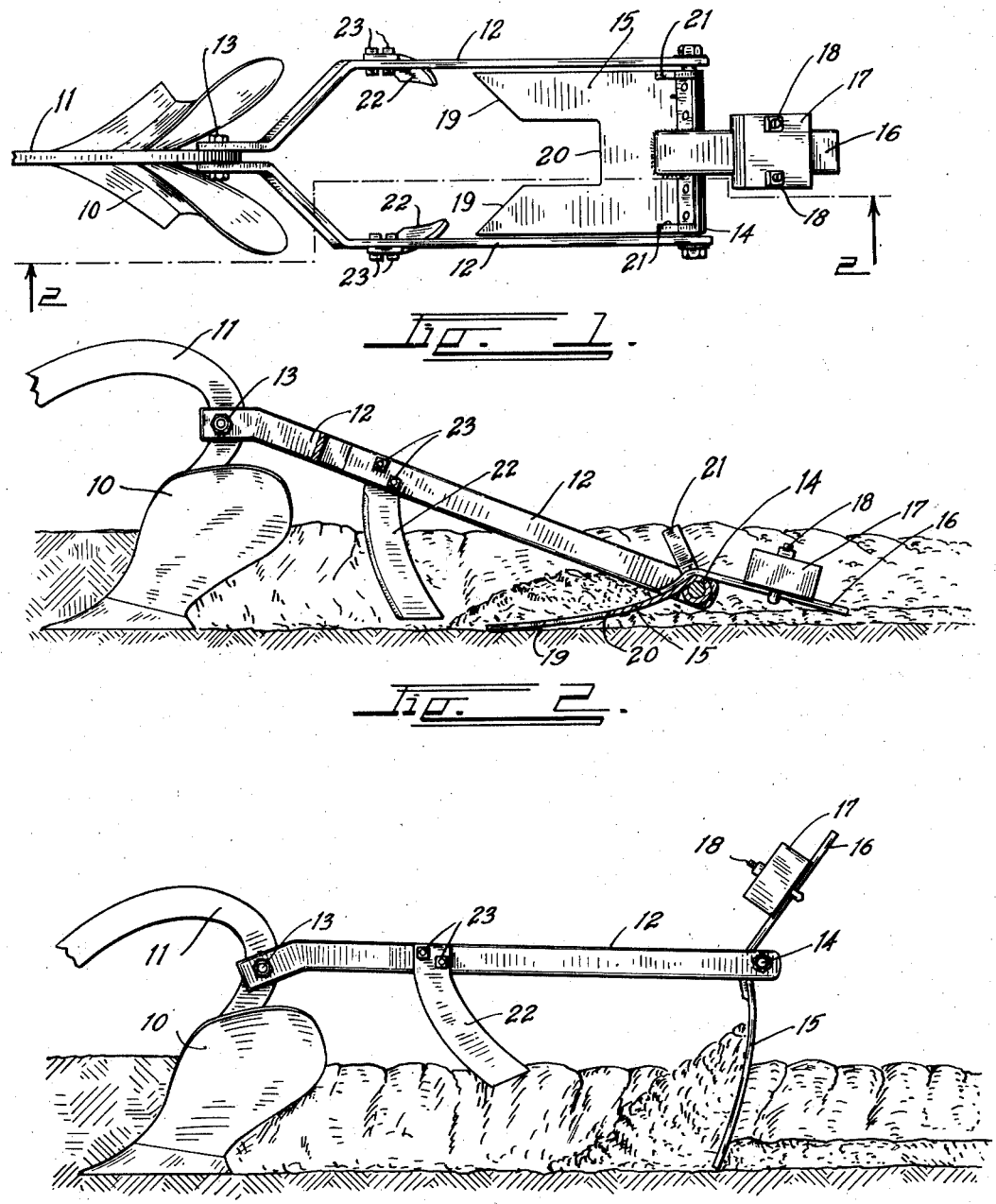
INVENTOR.
LOYD S. BROWN
BY
ATTORNEY.

Patented Jan. 16, 1940

2,187,262

UNITED STATES PATENT OFFICE 2,187,262

FURROW DAMMING MACHINE

Loyd S. Brown, Kanorado, Kans.

Application February 21, 1939, Serial No. 257,581

8 Claims. (Cl. 97—55)

This invention relates to a furrow damming device.

It is the present custom in the dry land districts of the West to place earth dams in the field furrows in order to hold the moisture of rains on the field and prevent quick run-offs and soil erosion. These dams are formed by piling earth in the furrows at spaced-apart distances to form pools of water therein.

The principal object of this invention is to provide a simple, efficient and automatic device which can be either attached to a plow or drawn independently along a furrow to automatically dam the furrow at spaced intervals without attention on the part of the driver.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a plan view of the device, illustrating it attached to a typical listing plow.

Fig. 2 is a longitudinal section, taken on the line 2—2, Fig. 1, illustrating the device in the filling position.

Fig. 3 is a side view illustrating the device in the dumping or dam forming position.

Figure 4:
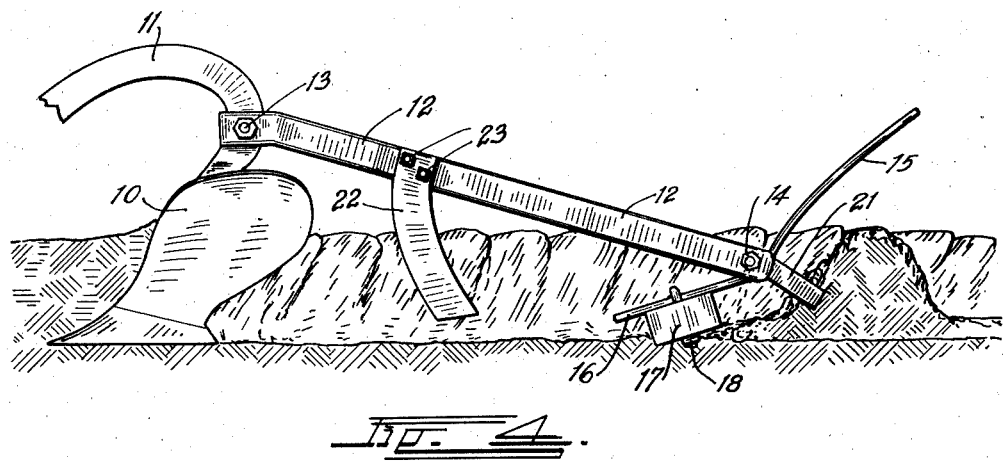
Fig. 4 is a similar view illustrating the device as it would appear after the dam had been formed.
Figure 5:
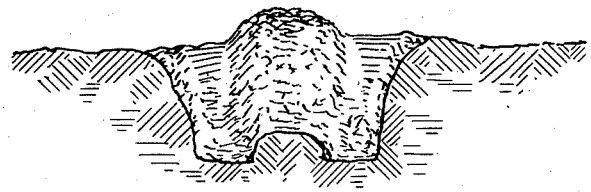
Fig. 5 is a cross-sectional view of the furrow formed by the dam device.
Figure 6:
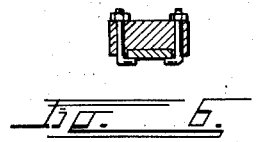
Fig. 6 is a detail section through the counterweight.

A typical listing plow is indicated at 10 with its plow beam at 11.

The improved damming device comprises a pair of draw bars 12 which extend from an attachment bolt 13, by means of which they may be secured to each side of the plow beam 11. At their rearward extremities, a hinge shaft 14 extends between the bars 12 and provides a hinge member for a damming blade or shovel 15.

The shovel 15 is free to rotate about the hinge shaft 14 and normally extends forwardly therefrom, as shown in Fig. 2. The forward edge of the shovel is beveled inwardly from each side to form inclined cutting or scraping edges as shown at 19. These inclined edges terminate at a central notch 20. A pair of lugs 21 are secured at each side of the rear extremity of the shovel and extend normally upward therefrom at a forward angle.

A counterweight arm 16 extends rearwardly from the shovel to support a counterweight 17. The counterweight can be adjusted to any position along the counterweight arm 16 and may be secured in the desired position by means of suitable hook bolts 18.

A curved weeding blade 22 is secured to each of the bars 12 by means of suitable bolts 23.

In operation, the device is drawn along the furrow, either as an independent device or as an attachment to a plow. As it moves along the furrow the blades 22 cut the surface weeds, runners, etc. at each side of the furrow and also act to cut the furrow bank and throw the soil toward the middle of the furrow where it will be picked up by the damming blade 15.

The soil continues to accumulate on the shovel until its weight creates sufficient drag to overcome the weight of the counterweight 17. This causes the shovel to stop and the rear extremity thereof is drawn forwardly lifting the counterweight, as shown in Fig. 3. As soon as the counterweight lifts, the points of the shovel will engage the bottom of the furrow to cause the shovel to turn over, thus releasing the pile of accumulated soil thereon to form a dam. The shovel blade then falls on the far side of the dam causing the lugs 21 to engage the furrow bottom so that the forward motion of the bars 12 will elevate the blade as shown in Fig. 4. The lugs 21 also serve to support the blade 15 over the dam so that it will not drag the crest of the dam back into the furrow.

Continued elevation forces the counterweight and the counterweight arm against the bottom of the furrow until the shovel is completely turned to its former position of Fig. 2. It will be noted that when the draw bars rise to form the dam, the blades 22 are also raised so that, at the point where the soil is piled to form the dam, the furrow sides are not cut away and there will be no openings or passages for water.

The central notch 20 in the shovel leaves a loose pile of soil along the center of the furrow to prevent a hard bottom crust from forming and to retain moisture. Normally the counterweight arm 16 rides along the top of this center soil pile to hold the shovel in the proper shoveling position.

Should a greater distance be desired between dams, the counterweight can be moved toward the extremity of the counterweight arm so that a greater accumulation of soil will be required before the dam is formed and, should the dams be desired closer together, the counterweight can, of course, be moved toward the hinge shaft 14.

As will be noted, the operation of the device requires no attention on the part of the operator. After the weight has been once set, it will form its dams at regular intervals without further attention.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A furrow damming device comprising: a shovel blade; means for drawing said shovel blade along a furrow; and hinge means for mounting said blade so that when the weight of soil thereon reaches a pre-determined amount said blade will rotate on said hinge means to dump said soil.

2. A furrow damming device comprising: a shovel blade; means for drawing said shovel blade along a furrow; hinge means for mounting said blade so that when the weight of soil thereon reaches a predetermined amount said blade will rotate on said hinge means to dump said soil; and a counterweight carried by said blade to counterbalance the rotating action thereof.

3. A furrow damming device comprising: a frame; means for attaching the forward extremity of said frame to a traction device; a hinge member at the rearward extremity of said frame; and a shovel blade hinged to said hinge member and normally extending forwardly therefrom so that as the weight of soil accumulates on said shovel blade the forward extremity of the latter will be stopped and its rearward extremity will be pulled forward to dump said accumulated soil.

4. A furrow damming device comprising: a frame; means for attaching the forward extremity of said frame to a traction device; a hinge member at the rearward extremity of said frame; a shovel blade hinged to said hinge member and normally extending forwardly therefrom so that as the weight of soil accumulates on said shovel blade the forward extremity of the latter will be stopped and its rearward extremity will be pulled forward to dump said accumulated soil; a counterweight arm mounted on said shovel blade and extending rearwardly from said hinge member; and a counterweight mounted on said arm so that when the weight of soil on said shovel stops its forward motion said counterweight will swing forwardly over said shovel.

5. A furrow damming device comprising: a frame; means for attaching the forward extremity of said frame to a traction device; a hinge member at the rearward extremity of said frame; a shovel blade hinged to said hinge member and normally extending forwardly therefrom so that as the weight of soil accumulates on said shovel blade the forward extremity of the latter will be stopped and its rearward extremity will be pulled forward to dump said accumulated soil; a counterweight arm mounted on said shovel blade and extending rearwardly from said hinge member; a counterweight mounted on said arm so that when the weight of soil on said shovel stops its forward motion said counterweight will swing forwardly over said shovel.

6. A furrow damming device comprising: a pair of draw bars; means for securing the forward extremities of said bars to a traction device, the rearward extremities thereof being separated; a hinge shaft extending between the rearward extremities of said bars; a damming shovel hingedly mounted on said hinge shaft and normally extending forwardly and downwardly therefrom; a counterweight arm attached to said shovel and extending rearwardly from said hinge shaft and normally in engagement with the bottom of the furrow; and a counterweight on said counterweight arm.

7. A furrow damming device comprising: a pair of draw bars; means for securing the forward extremities of said bars to a traction device, the rearward extremities thereof being separated; a hinge shaft extending between the rearward extremities of said bars; a damming shovel hingedly mounted on said hinge shaft and normally extending forwardly and downwardly therefrom; a counterweight arm attached to said shovel and extending rearwardly from said hinge shaft and normally in engagement with the bottom of the furrow; and a counterweight on said counterweight arm, the forward edge of said shovel being notched to allow a pile of earth to remain in the bottom of the furrow, said counterweight arm riding along the top of said pile.

8. A furrow damming device comprising: a pair of draw bars; means for securing the forward extremities of said bars to a traction device, the rearward extremities thereof being separated; a hinge shaft extending between the rearward extremities of said bars; a damming shovel hingedly mounted on said hinge shaft and normally extending forwardly and downwardly therefrom; a counterweight arm attached to said shovel and extending rearwardly from said hinge shaft and normally in engagement with the bottom of the furrow; a counterweight on said counterweight arm, the forward edge of said shovel being notched to allow a pile of earth to remain in the bottom of the furrow, said counterweight arm riding along the top of said pile; and ground engaging members extending from the upper face of said shovel adjacent said hinge shaft so that, when said shovel is inverted, said members will engage the bottom of the furrow to support and rotate said shovel.

LOYD S. BROWN.